(12) United States Patent
Kiefer et al.

(10) Patent No.: US 6,443,056 B1
(45) Date of Patent: Sep. 3, 2002

(54) REMOTE FAN PODS FOR SIDE-TO-SIDE AIRFLOW ON A REFRIGERATED CONTAINER

(75) Inventors: David D. Kiefer, Bloomington, IN (US); Michael E. Davis, Athens; David R. Carey, Danielsville, both of GA (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 10/085,202

(22) Filed: Feb. 27, 2002

(51) Int. Cl.[7] .................. A23B 7/00; A23B 7/144; A23L 1/00; A23L 3/00
(52) U.S. Cl. ................ 99/475; 62/78; 62/329; 99/467; 99/476; 99/517
(58) Field of Search .................... 99/352, 355, 467, 99/468, 472, 477, 484, 485, 516, 517, 534; 34/192, 194, 196, 231, 222; 62/78, 79, 329, 381, 401, 239, 179, 127, 414, 419, 141, 303, 374, 384; 165/65; 312/116, 236; 422/28, 40, 292; 426/316–320, 395, 419, 263

(56) References Cited

U.S. PATENT DOCUMENTS

| | | | | |
|---|---|---|---|---|
| 4,879,877 A | * | 11/1989 | Hicke | 62/329 X |
| 4,894,997 A | * | 1/1990 | Urushizaki et al. | 99/468 X |
| 5,318,789 A | * | 6/1994 | Nakagawa et al. | 426/316 |
| 5,373,780 A | * | 12/1994 | Bianco | 99/475 |
| 5,419,153 A | * | 5/1995 | Hartley | 99/468 X |
| 5,457,963 A | * | 10/1995 | Cahill-O'Brien et al. | 422/40 X |
| 5,566,608 A | * | 10/1996 | Vejdani et al. | 99/475 X |
| 5,623,105 A | * | 4/1997 | Liston et al. | 62/78 |
| 5,660,057 A | * | 8/1997 | Tyree et al. | 62/384 |
| 5,715,685 A | * | 2/1998 | Takasugi | 62/239 X |
| 5,778,557 A | * | 7/1998 | Leavens | 99/474 |
| 5,789,007 A | * | 8/1998 | Bianco | 99/468 X |
| 5,801,317 A | * | 9/1998 | Liston et al. | 99/468 |
| 6,012,384 A | | 1/2000 | Badalament, et al. | |

* cited by examiner

Primary Examiner—Timothy F. Simone
(74) Attorney, Agent, or Firm—Wall Marjama & Bilinski LLP

(57) ABSTRACT

Apparatus for delivering conditioned air from the mixing chamber of a mobile container into a pair of supply air plenums that extend rearwardly along the side walls of the container. A series of fan units are contained within pods located within the mixing chamber adjacent to the front end of each supply air plenum. The pods are stacked in vertical alignment from the floor of the container to about the height of the container ceiling. Each pod includes two fan units that are contained in separate compartments. Each fan unit can be removed easily from the compartment and each pod unit can similarly be removed separately from the stack to facilitate mounting and removal of the pods as well as the individual fan units.

11 Claims, 5 Drawing Sheets

REMOTE FAN PODS FOR SIDE-TO-SIDE AIRFLOW ON A REFRIGERATED CONTAINER

FIELD OF THE INVENTION

This invention relates generally to a fan arrangement for circulating conditioned air through a mobile container used to transport perishable goods such as fruits and vegetables.

BACKGROUND OF THE INVENTION

In U.S. Pat. No. 6,012,384, there is disclosed an air-tight mobile container for storing perishable goods that ripen exothermically while in transit. A refrigeration system is arranged to provide conditioned air to the container where it is combined with container air within a mixing chamber. Blowers are employed to direct air from the mixing chamber into supply air plenums extending along the opposed side walls of the container. Perishable goods are stacked in air penetratable boxes located along the length of the plenums and the end of each plenum is blocked. The fans deliver air at a high volume rate of flow into the supply air plenums whereupon the pressure within the blocked plenums is raised to a level such that the air is forced through the boxes containing the produce. The large volume of pressurized air guarantees accurate temperature control within the container and also the forced convection produced by the conditioned air helps to control the ripening of the product. The conditioned air that has passed through the boxes is then directed back to the mixing chamber via a center isle under the influence of the fans.

It has been found that approximately 10,000 CFMs of air is needed to create sufficient air flow through the cargo in an average-sized mobile container to properly control the temperature within the container and condition the cargo. Accordingly, a number of individual fan units are required to produce the desired air flow through the container. Mounting the fan effectively in the restricted space of the mixing chamber has proven to be difficult. In addition, gaining access to the fan units within the mixing chamber to conduct maintenance and repairs on the equipment has also proven to be as equally difficult.

SUMMARY OF THE INVENTION

It is a primary object of the present invention to improve mobile containers for transporting perishable goods.

It is a further object of the present invention to provide more accurate control over the temperature of perishable goods that are being transported in a mobile container.

A still further object of the present invention is to more efficiently mount a number of fan units within the confined space of a mixing chamber located within a mobile container.

Another object of the present invention is to provide a high volume of conditioned air flow through a mobile container for transporting perishable produce.

Yet another object of the present invention is to facilitate the mounting and maintaining of multiple fan units within the confined space of a mixing chamber located within a mobile container that is used to transport perishable goods.

These and other objects of the present invention are attained by means of apparatus for delivering conditioned air from a mixing chamber located in the front of a mobile container into a pair of supply air plenums that extend rearwardly along the opposed side walls of the container. A series of fan pods are located within the mixing chamber adjacent to the supply air plenums. Each pod includes two separate fan compartments that are stacked in vertical alignment one over the other. A removable bracket is mounted in each compartment for supporting a fan unit within the compartment enabling the units to be easily removed from the compartments. Each compartment further includes a front panel that contains an air inlet opening that is located inside the mixing chamber and a side panel that contains an air outlet opening that empties directly into one of the supply air plenums. Each pod is removably secured to the front wall and one side wall of the container by studs so that the pods can be individually removed from the mixing chamber.

BRIEF DESCRIPTION OF THE DRAWING

For a better understanding of these and other objects of the present invention, reference will be made to the following detailed description of the invention which is to be read in association with the accompanying drawings, wherein.

DETAILED DESCRIPTION OF THE INVENTION

Figure 1:
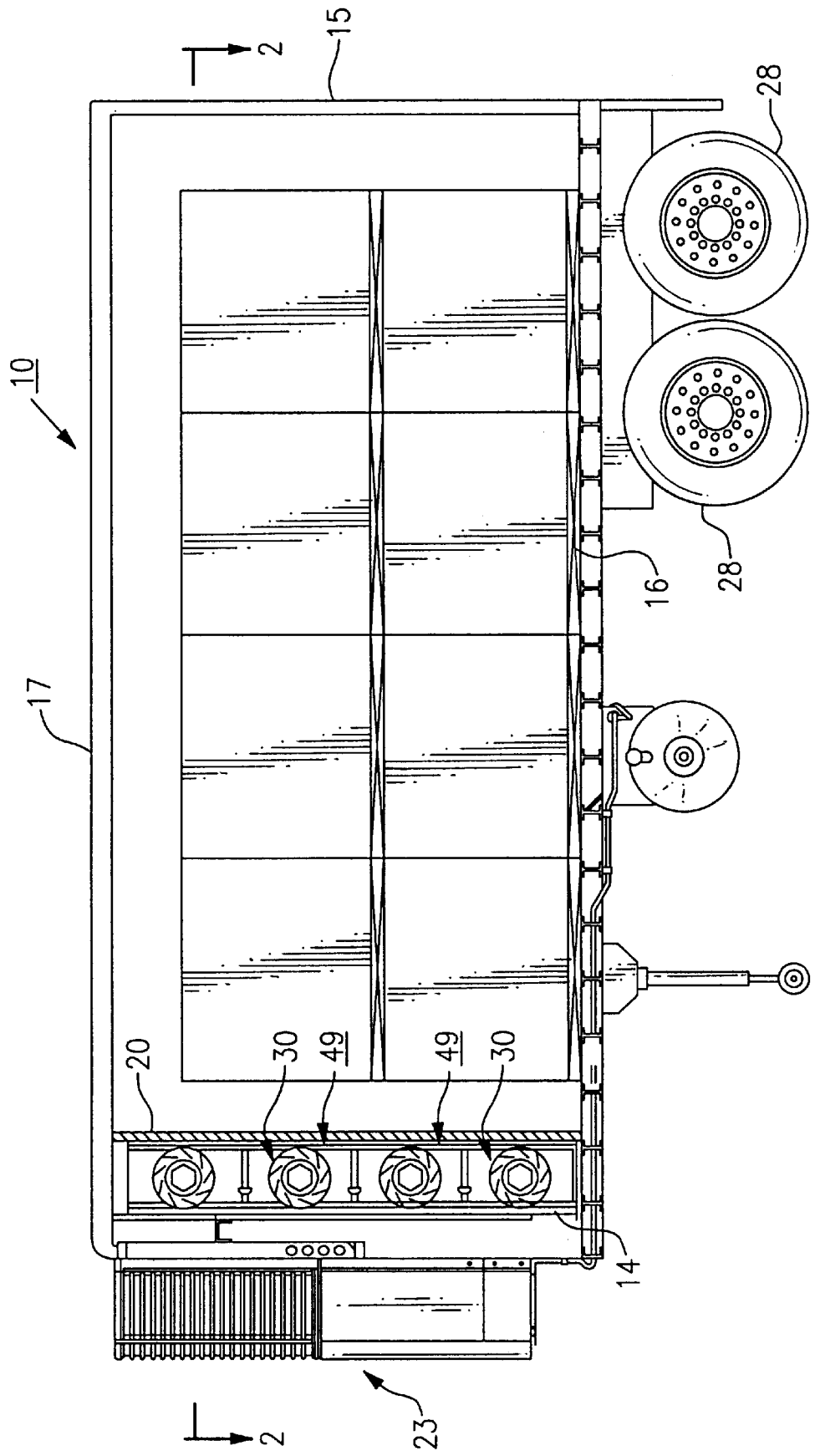
FIG. 1 is a side elevation in section of a mobile container embodying the teachings of the present invention.
Figure 2:
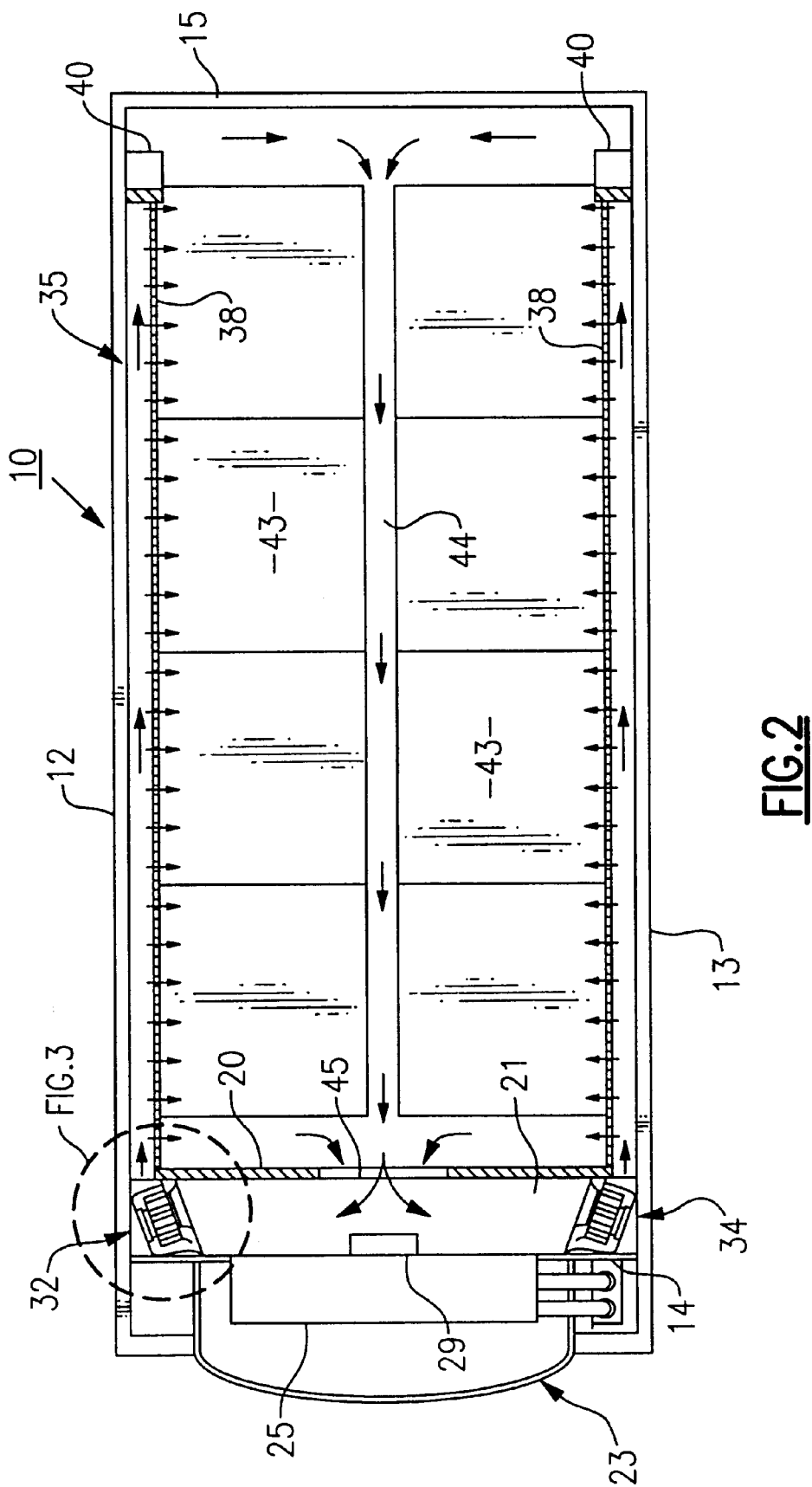
FIG. 2 is a sectional view taken along lines 2—2 in FIG. 1.

Referring initially to FIGS. 1 and 2, there is illustrated an enclosed mobile container, generally referenced 10, that embodies the teachings of the present invention. The container includes a pair of opposed sidewalls 12 and 13, a front wall 14, a rear wall 15, a floor 16 and a ceiling 17 all being of standard construction used throughout the industry. The back wall is furnished with one or more doors (not shown) through which cargo can be loaded into the container. A partition 20 that extends from the container floor to its ceiling is mounted inside the container adjacent to the front wall 14 to establish a mixing chamber 21 in the forward part of the container. A refrigerator unit 23 is mounted on the front wall of the container which includes a heat exchanger 25 that is arranged to deliver conditioned air into the mixing chamber. The container is provided with appropriate seals to prevent inside air from escaping from the container when the container doors are closed.

The container is equipped with wheels 28—28 so that it can be transported by a cab or tractor from place to place. The mobile unit is intended to be used as a ripening room for certain perishable produce so that the ripening process can be closely controlled when the cargo is in transit. In certain applications, the produce is stored in a dormant condition and a ripening gas is mixed with the conditioned air within the mixing chamber which aids in the ripening process. To this end, a gas generator 29 is placed within the mixing chamber which introduces the gas directly into the chamber to modify the atmosphere within the container for a predetermined period of time to allow the produce to reach a desired stage of ripeness. At that time, the gas flow is terminated and the gas is purged from the container.

A series of fan units 30—30 are mounted in stacks within the mixing chamber adjacent the opposed side walls of the container. A first stack 32 containing four fan units is located adjacent to the curbside wall 12 of the container while a second stack 34 also containing four fan units is located adjacent to the roadside sidewall 13. The first stack 32 is arranged to draw air from the mixing chamber and direct the air toward the rear of the container along the curbside supply air plenum that is generally referenced 35 (FIG. 2). The second stack of fan units 34 is arranged to draw air from the mixing chamber and direct the air plenum 36 toward the rear of the container as illustrated. As will be explained in greater detail below, the roadside stack 34 is a mirror image of the curbside stack 32, however, each stack functions in the same manner to gain the same results. Each plenum is located adjacent to a side wall of the container so that the container wall forms one wall of the plenum. Each plenum further includes a back closure wall 40 that can be repositioned along the length of the plenum so that the length of the plenum may be adjusted depending upon the cargo that is in transit.

The cargo is carried in bins or boxes 43—43 which are stacked in two parallel rows along one side of each plenum. The boxes shown are stacked against open stacking frames 38—38 running along one side of each plenum. Although the stacking frame may be eliminated from the assembly without departing from the invention, the frames provide, in many applications, a convenient means to align the stacks. The boxes, like the frames, are also open to air so that the air flowing down the supply air plenums can freely pass into and through the boxes in convective heat transfer relationship with the produce stored therein. A central isle 44 is provided between the rows through which the air that has passed through the boxes can be returned to the mixing chamber. Air entrance opening 45 is contained in the mixing chamber wall partition 20 through which the conditioned air is returned to the mixing chamber. The return opening is coaxially aligned with the central isle of the container and extends generally from the floor to the ceiling of the container.

Figure 5:
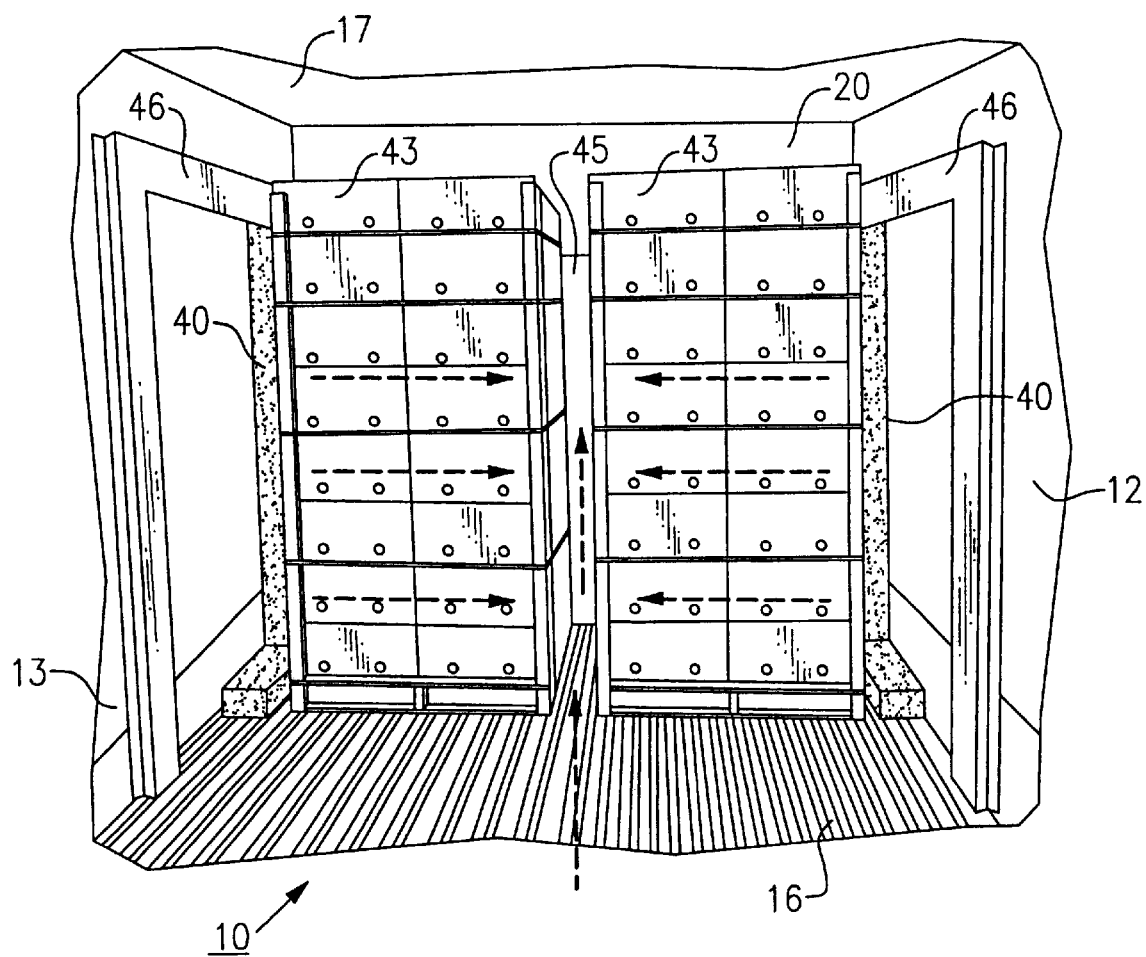
FIG. 5 is a rear view of the container illustrated in FIG. 1.

As illustrated in FIG. 5, an elevated rail 46 is mounted upon each side wall of the container against which the uppermost boxes in each row are stacked so that when the stacks are completed, each supply air plenum is a generally enclosed chamber. The units are arranged to supply a high volume of air into the plenum so that the plenums become pressurized. This, in turn, forces the supply through the boxes and into contact with the perishable produce stored in the boxes. The air is then passed into the center isle as indicated by the arrows before being returned to the mixing chamber where some of the return air is passed over the evaporator coil of the refrigeration system and the remaining air is mixed with the conditioned air provided by the refrigeration unit. The flow of air through the mixing chamber is rather turbulent due to the action of the fan units and the flow of conditioned air from the refrigeration system. As a result, the ripening gas produced by the gas generator 28 is thoroughly mixed with the conditioned supply air before reaching the produce.

As indicated by the arrows in FIG. 2, conditioned air is introduced into the mixing chamber from the refrigeration system. The fan units draw the air from the mixing chamber and move a high volume of air into each supply air plenum. The plenums chambers are closed at the back end by a movable wall 40. The wall is repositionable along the length of the container so that the length of the two plenum chambers can be adjusted depending upon the load. The volume of air delivered into each plenum chamber is high enough to pressurize the chamber and thus force the conditioned air through the boxes containing the produce and thus efficiently treat the produce. Upon being returned to the mixing chamber, some of the return air is recirculated through the heat exchanger for further conditioning and the remaining air mixed with the conditioned air.

Figure 3:
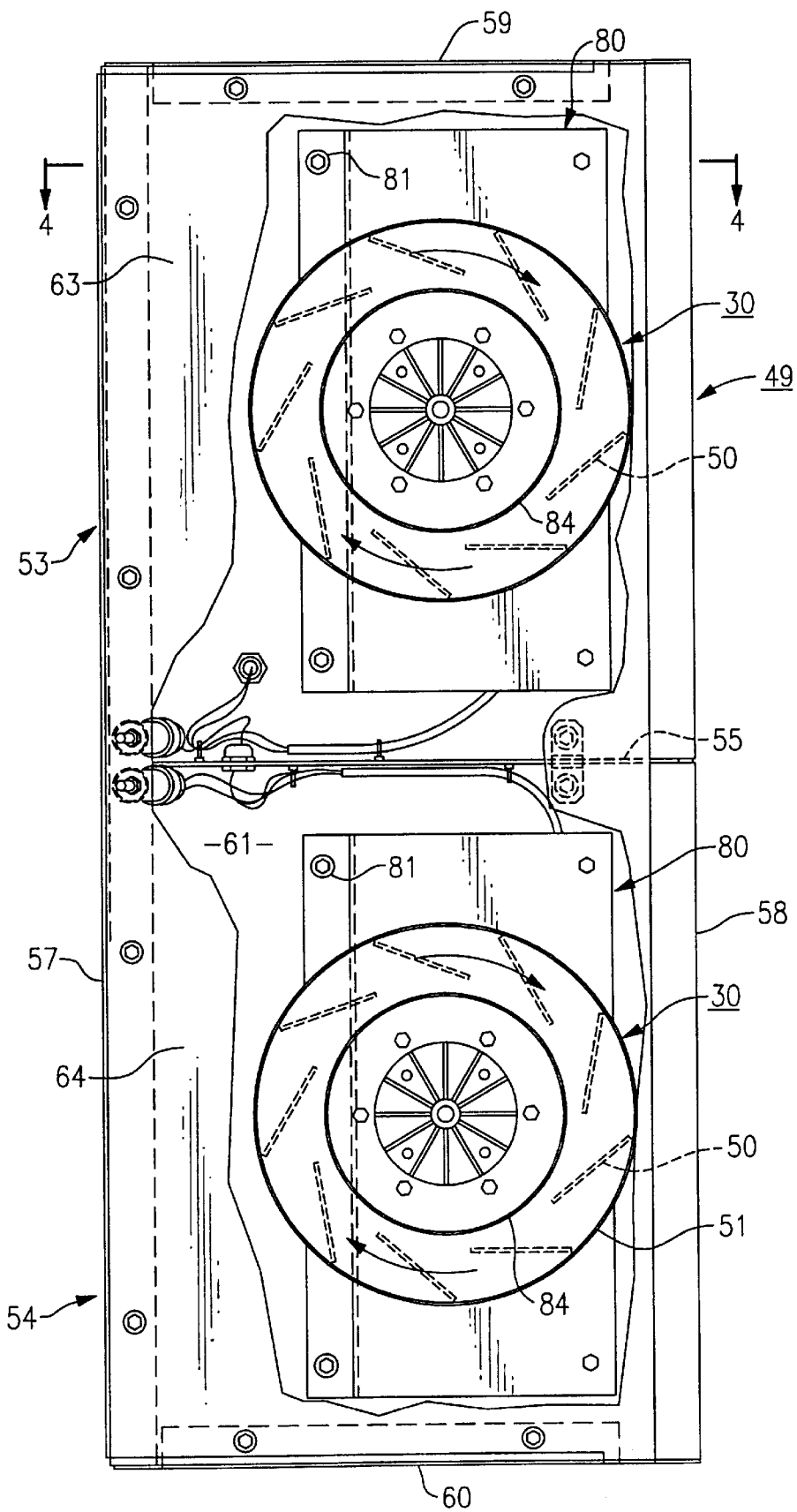
FIG. 3 is an enlarged front view with portions broken away showing a fan pod arrangement employed in the practice of the present invention.
Figure 4:
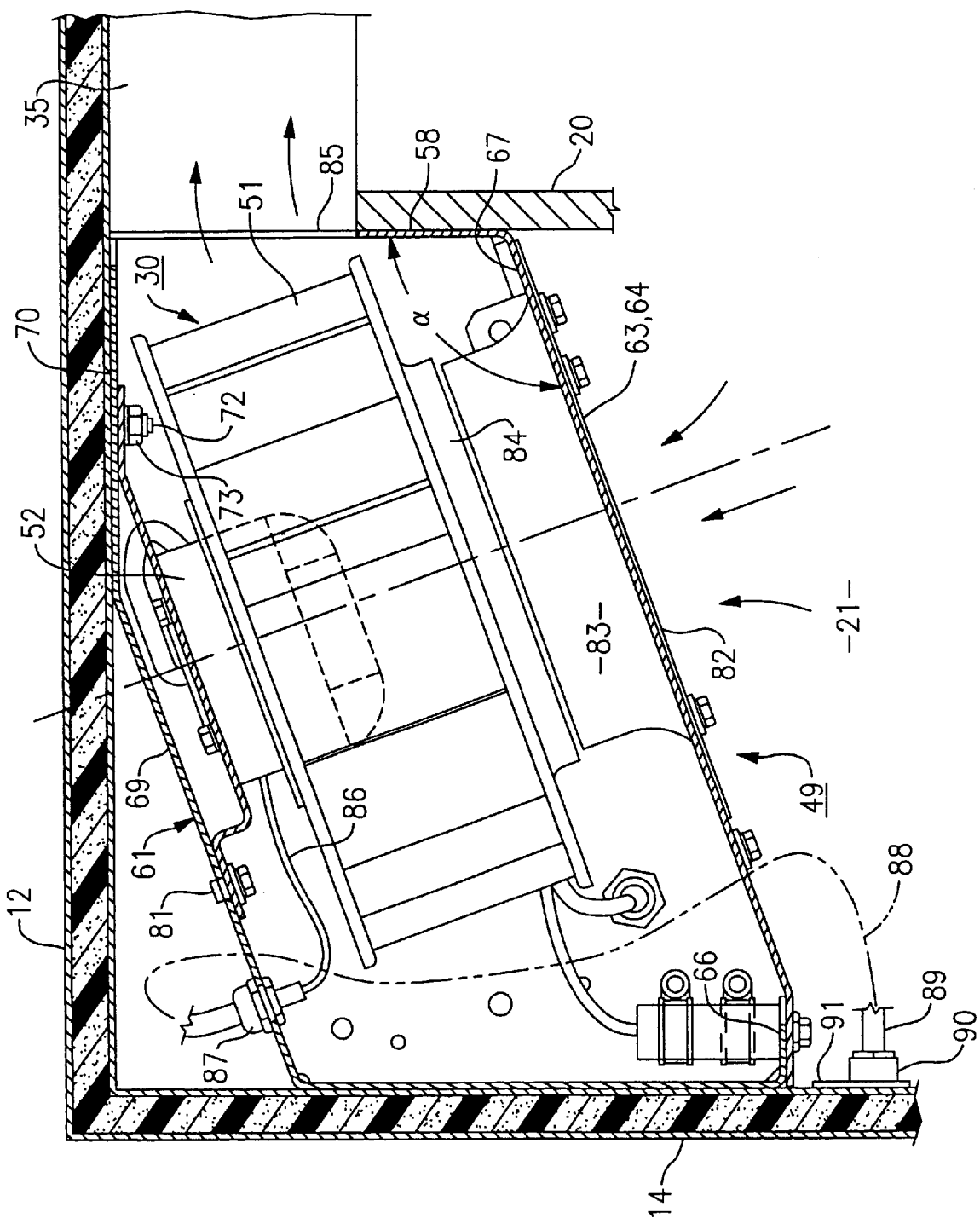
FIG. 4 is a section taken along lines 4—4 in FIG. 3.

With further reference to FIGS. 3 and 4, there is illustrated a single fan pod, generally referenced 49, that is arranged to house two fan units 30 in the stack 32 that is located adjacent to the curbside wall 12 of the container. Each fan unit, in turn, includes a blower wheel 51 (FIG. 4) and a self-contained motor 52 for turning the blower wheel. Each blower wheel further includes backwardly inclined blades 50 designed to draw air from the mixing chamber and force the air into the adjacent supply air plenums. The motors all operate on 220 volt A.C. which is provided by a 5 KV generator located in the drive section of the refrigeration system.

Each fan stack contains two pods, as illustrated in FIG. 3, that are placed one upon the other in each front corner of the container. The height of each stack is about equal to the inside height of the container as measured between the floor and the ceiling. Each pod is further divided into two compartments that include an upper compartment 53 and a lower compartment 54. The two compartments are separated by a commonly shared wall 55. Each pod further includes a pair of side panels 57 and 58, a top panel 59 and a bottom panel 60. A rear panel 61 encloses the back of the pod and a removable front panel 63 closes the front of the top compartment and a similar front panel 64 closes the front of the lower compartment. The front panels form an obtuse angle with sidewall 58 and are joined to the pod side panels by threaded fasteners 65 that are threaded into flanges 66 and 67 that are integral with the side panels.

The back panel of the pod contains a first section 69 that is integrally joined to side panel 57 and which is parallely aligned with the front panels and a second section 70 that runs perpendicular to the side panels of the pod. In assembly, the side panel 57 of the cabinet is placed against the front wall of the container and the second section 70 of the back panel 61 is placed against the adjacent side wall of the container. The side panel 57 of the pod and the second section 70 of the back panel are secured to the container walls by studs 72, one of which is shown in FIG. 4, using nuts 73 so that the entire pod can be easily removed from the container.

A bracket, generally referenced 80, is mounted against the rear panel of the pod in each compartment for supporting the fan unit 30 within the compartment. Each bracket is secured to the rear panel by threaded fasteners 81—81 so that the bracket and the fan unit can be easily removed from the compartment as a unit in the event that the fan units need replacement or must be repaired. Each fan is placed at an angle within the compartment so that the front face of the fan is generally parallel with the front panel of the compartment. An air inlet opening 82 is provided in the front panel of each compartment and is encircled by an inlet nozzle 83 secured to the inside of the panel. The nozzle is arranged to conduct air from the mixing chamber into the front entrance 84 of the fan. The incoming air is captured in the backward extended blades of the fan and is pumped into the adjacent plenum via an outlet opening 85 provided in sidewall 58 of the pod.

The electrical line 86 servicing each motor is plugged into a receptacle 87 located in the back panel of each compartment enabling the fan unit to be quickly removed and replaced in its compartment. The wiring 88 from the receptacle 87 is enclosed with wiring from other fan units contained in the stack within a wiring harness 89 which, in turn, is plugged into a second receptacle 90 located in an electrical panel carried on the front wall of the container. Here again, the harness can be disconnected from the container and the entire stack easily removed from the container. The harness wiring is passed behind the pod stacks in the space provided between the back panels of the pods and the walls of the container. The electrical panels servicing the stacks are located high on the front wall of the container so that the harness can be brought over the top of the stack and plugged into the electrical panel receptor. As a result, the wiring servicing the stacks is well isolated from the main body of the container and there is little or no danger of the wiring being entangled with other objects within the container.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. Apparatus for delivering conditioned air from a mixing chamber located in the front of an enclosed mobile container into a pair of supply air plenums that extend along opposed side walls of the container, wherein said apparatus includes:

a series of vertically stacked fan pods located inside the mixing chamber adjacent to one end of each supply air plenum, each pod containing two separate, enclosed fan compartments that are stacked in vertical alignment, one on top of the other;

a removable bracket mounted within each compartment for supporting a fan unit so that each fan unit and bracket can be removed as a unit from the pod;

each compartment having a front panel containing an air inlet opening that is located within the mixing chamber through which conditioned supply air is drawn into the compartment and a side panel containing an outlet opening through which supply air is discharged directly into an adjacent supply air plenum; and fastening means for removably mounting each pod within the mixing chamber against the front wall and one side wall of the container.

2. The apparatus of claim 1 wherein each compartment contains a pair of opposed side panels that are in parallel alignment with the front wall of the container and is perpendicularly aligned with one side wall of the container and the front panel of the compartment forms an obtuse angle with one of said side panels.

3. The apparatus of claim 2 wherein said angle is between 100° and 120°.

4. The apparatus of claim 2 wherein each fan unit contains a central axis that is perpendicular to the front panel of the compartment.

5. The apparatus of claim 2 wherein each fan unit contains an electric motor and a blower wheel and further includes a wiring means for connecting the motor to a plug in receptacle mounted in one wall of the container.

6. The apparatus of claim 1 wherein two fan pods are stacked in vertical alignment adjacent to the opposite side walls of the container within the mixing chamber.

7. The apparatus of claim 6 wherein the height of each pod stack is about equal to the interior height of the container floor and the container ceiling.

8. The apparatus of claim 1 wherein each fan unit contains a nozzle at the air inlet to the fan unit for directing air into the fan unit.

9. The apparatus of claim 1 wherein the blower fan has rearwardly inclined blades.

10. The apparatus of claim 2 wherein the side panels and a rear panel of the two compartments contained within each pod are integrally joined.

11. The apparatus of claim 10 wherein the back panel is in parallel alignment with the front panel of each compartment.

* * * * *